United States Patent [19]

Zhaog

[11] Patent Number: 5,754,249
[45] Date of Patent: May 19, 1998

[54] INTERLACED IMAGE SYNCHRONIZATION METHOD FOR FIELD SEQUENTIAL DISPLAY

[75] Inventor: Yee-Lu Zhaog, Taoyuan, Taiwan

[73] Assignee: Industrial Technology Research Institute, Hsinchu, Taiwan

[21] Appl. No.: 549,865

[22] Filed: Oct. 30, 1995

[51] Int. Cl.$^6$ ............................................. H04N 5/06
[52] U.S. Cl. ........................... 348/521; 348/455; 348/503; 348/742
[58] Field of Search ...................... 348/742, 743, 348/503, 497–499, 512, 513, 514, 540, 541, 542, 543, 551, 455, 521, 522, 524, 523; H04N 9/12, 5/06, 9/45

[56] References Cited

U.S. PATENT DOCUMENTS

| | | | |
|---|---|---|---|
| 5,508,738 | 4/1996 | Janssen et al. | 348/551 |
| 5,528,317 | 6/1996 | Gove et al. | 348/743 |

*Primary Examiner*—Michael H. Lee
*Attorney, Agent, or Firm*—George O. Saile; Stephen B. Ackerman

[57] ABSTRACT

A method for the conversion of conventional interlaced video display synchronization signals to those required for a field sequential color display interlaced video synchronization signals comprises the steps of receiving the conventional horizontal and vertical synchronization signals; multiplying the repetition rates of these signals by a factor that is number of component colors that comprise the colors of the video display; selecting time segments of the multiplied horizontal synchronization signals; phase shifting these selected time segments to align with the multiplied vertical synchronization signal; merging the phase shifted and the non-phase shifted time segments of the multiplied horizontal synchronization signal to form the field sequential color display horizontal synchronization signal; and amplifying and buffering the multiplied vertical synchronization signal and the field sequential color display horizontal synchronization signal to act as input to the deflection circuitry of a field is sequential color display.

11 Claims, 10 Drawing Sheets

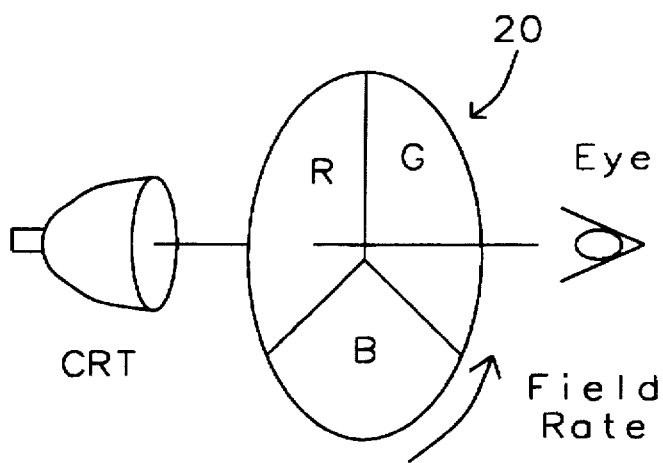
*FIG. 1a - Prior Art*
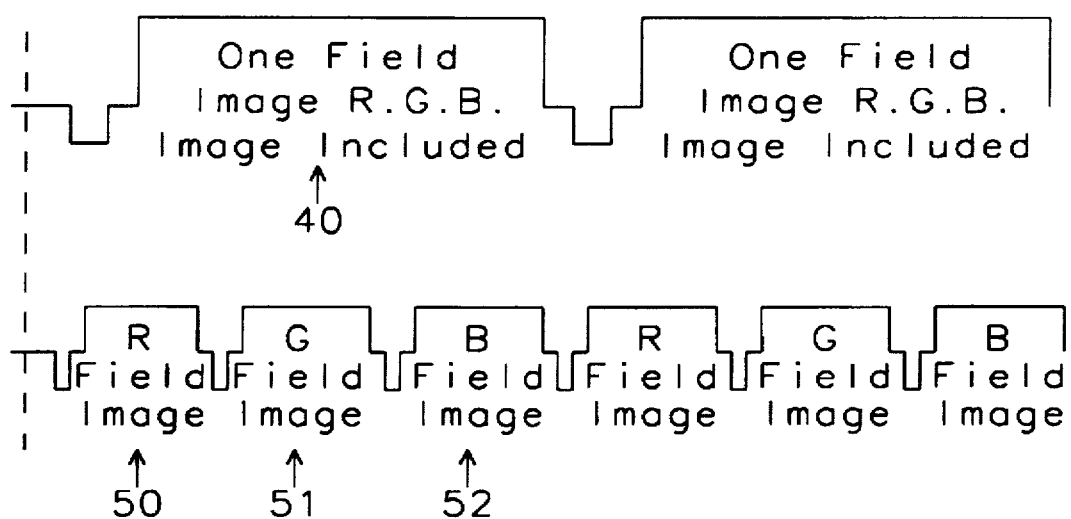
*FIG. 1b - Prior Art*

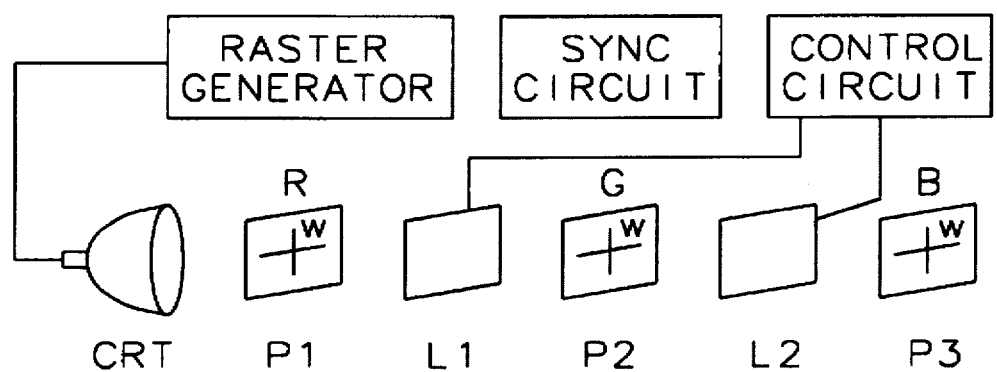
FIG. 2 - Prior Art

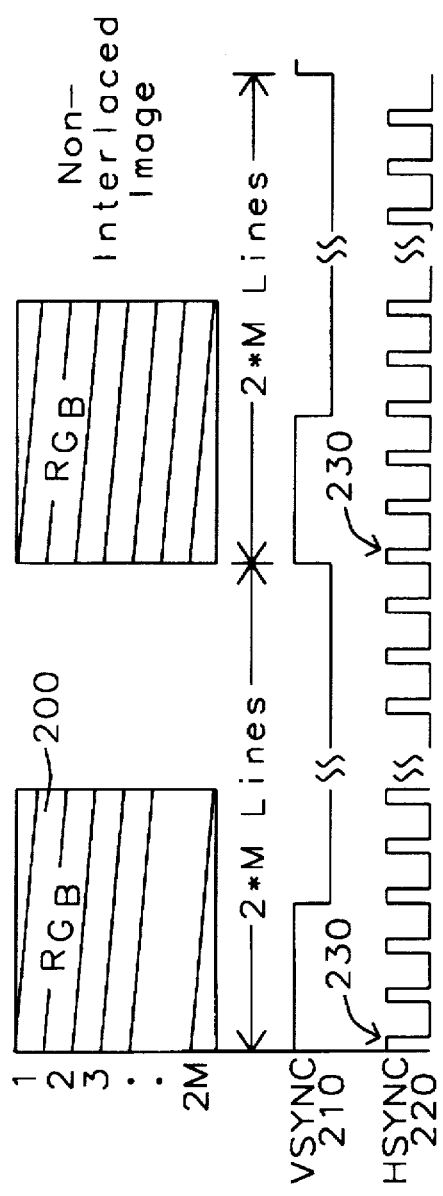
FIG. 3 – Prior Art
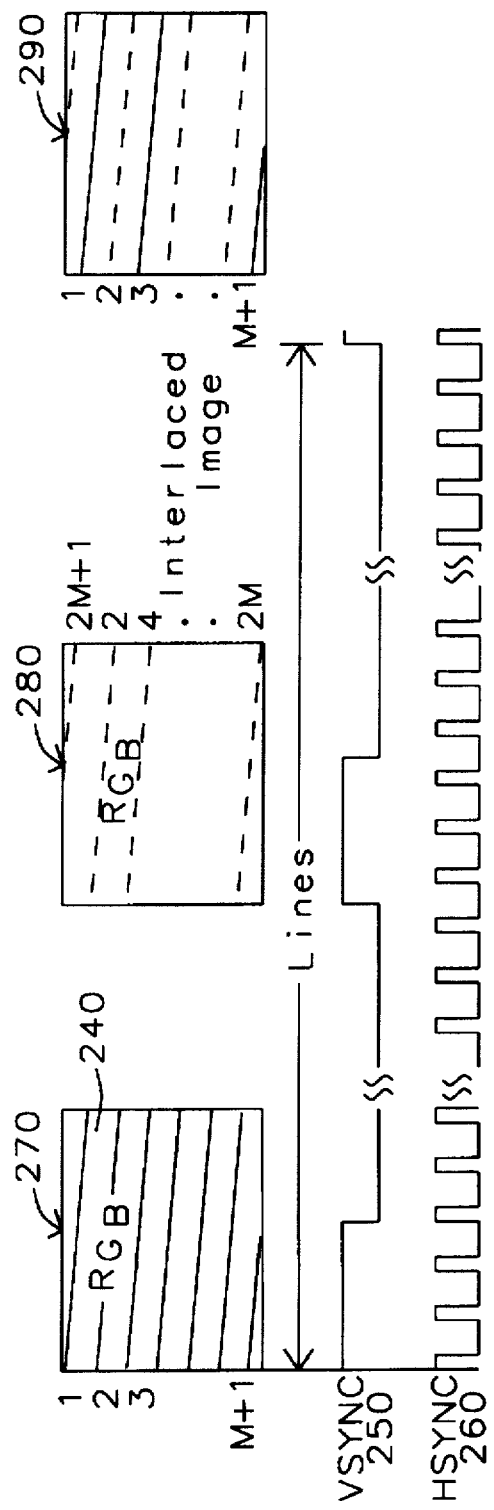
FIG. 4 – Prior Art

INTERLACED IMAGE SYNCHRONIZATION METHOD FOR FIELD SEQUENTIAL DISPLAY

BACKGROUND OF INVENTION

1. Field of Invention

This invention relates to field sequential color displays that employ liquid crystal optical switches for color selection and in particular to the methods of conversion of universal standard interlaced video formats to field sequential interlaced format to display video information.

2. Description of Related Art

If red, green, and blue color fields of varying intensity are impinged upon the eye in sequence rapidly enough over time, the human visual system will perform a temporal blending of the image. This phenomena allows the field sequential color displays to sequentially display red, green, and blue monochrome images to create a color display.

A field sequential color display (FSCD) system incorporates a monochrome cathode ray tube (CRT) similar to the type disclosed in U.S. Pat. No. 5,221,875 (issued Jun. 22, 1993 to Odenthal for a "High Resolution Cathode Ray Tube With High Bandwidth Capability"), a color switching device and control circuit as described in U.S. Pat. No. 4,582,396 (issued Apr. 15, 1986 to Bos, et al. for a "Field Sequential Color Display System Using Optical Retardation", U.S. Pat. No. 4,611,889 (issued Sep. 16, 1986 to Buzak for a "Field Sequential Liquid Display with Enhanced Brightness"), U.S. Pat. No. 4,635,051 (issued Jan. 6, 1987 to Bos for "High-Speed Color Display System Incorporating Same"), U.S. Pat. No. 4,758,818 (issued Jul. 19, 1988 to Vatne for a "Switchable Color Filter and Field Sequential Full Color Display System Incorporating Same"), U.S. Pat. No. 4,726,663 (issued Feb. 23, 1988 to Buzak for a "Switchable Color Filter with Enhanced Transmissivity"), U.S. Pat. No. 5,187,603 (issued Feb. 16, 1993 to Bos for a "High Contrast Light Shutter"), and U.S. Pat. No. 5,387,920 (issued Feb. 7, 1995 to Bos, et al. for a "Switchable Color Filter and Field Sequential Full Color Display System Incorporating Same"). The color switch device selects the color field to be displayed sequentially and the control circuitry converts the input video data format and provides necessary synchronization of the CRT display and the color switching device.

The original field sequential color display designs as shown in FIG. 1a used an electromechanical driven color wheel 20 rotating at the field image rate to sequentially display the red, green and blue colors.

In FIG. 1b, the video information of one field image 40 is decomposed into three component field images (R Field Image 50, G Field Image 51, and B Field Image 52). These field images were scanned on the CRT at rate three times faster than the normal "One Field Image with R, G, B Image Included" 40. Due to the temporal blending in the human visual system, a color image would be perceived.

A later type of FSCD used a liquid crystal combined with a color polarizer to serve as the color switch. In FIG. 2 the three color selective polarizing filters P1, P2, P3 each let one color pass in the vertical polarizing axis and the white light to pass in the horizontal axis. The liquid crystal devices L1, L2 will, depending on the state of the devices, either allow the polarization rotation of 90 degrees of the light or not. Through the combination of color selective polarizing filters and the liquid crystal devices any of the Red, Green, or Blue colors can be selected.

Nearly all conventional CRTs, create their images spatially. Each picture element is three sub-picture elements spaced too closely for the human eye to differentiate the three elements, but instead sees light from the three colors as a single color. This has allowed multiple sets of standards for the electronic transmission of video images with color data contained in multiple signals. Most standards use three signals, red, green, and blue, that will be transmitted simultaneously. For these images to be displayed on the FSCD's, the multiple signals must be transformed to a format that is acceptable for FSCD's and the field rate of each frame of the video to be displayed must be increased by a factor of that is a multiple of the number of the component colors.

In FIG. 3, the conventional non-interlaced display will scan the electron beam 200 horizontally across the CRT the number of times equal to the number of rows of picture elements on the CRT. The vertical synchronization signal 210 will be aligned to the leading edge of the horizontal synchronization signal 220 for the first row of picture elements of the CRT 230. In FIG. 4 for an interlaced display the electron beam 240 will scan every second row of picture elements. For instance, in the first field or odd field of the display 270, the beam will scan row number 1, 3,5,7, . . . , 2M+1, and the first half of the 2M+1 row. In the second field or even field 280, of the display the beam will scan the second half of the 2M+1 row, and rows 2, 4,6, . . . , 2M. These two fields will form one interlaced image 290. The distinction between the odd field 270 and the even field 280 is determined by the relationship of the vertical synchronization signal 250 and the horizontal synchronization signal 260. If the rising edge of the vertical synchronization signal 250 and the rising edge of the horizontal synchronization signal 260 are in alignment then the field is the odd field. If the edges of the vertical and horizontal synchronization signals 250, 260 are not in alignment, but at half of the horizontal period shift, then the field is the even field. The video information that will modulate the intensity of the electron beam will be transferred to the CRT at a rate that is half that of the non-interlaced image thus requiring two fields or vertical scans 250 to completely display a single frame of the image 290.

For a field sequential color display, as shown in FIG. 5, the synchronization of a non-interlaced image 300 involves multiplying the repetition rate of the vertical synchronization pulses 300 and the horizontal synchronization pulses 330 by a factor equal to the number of component colors that comprise the video color information. In the case of the conventional system comprising red, green, and blue component colors, the factor is three. Therefore the field sequential color display will have three separate sub-field images 340, 350, 360 that will form a single frame of the display image. The vertical synchronization pulses 370 and the horizontal synchronization pulses 380 will have a repetition rate that is three times that of a conventional display system. Since only the repetition rate is effected the phase alignment of the vertical and horizontal synchronization is preserved.

The use of interlaced video images on field sequential displays has traditionally used specialized equipment where the vertical and horizontal synchronization is incorporated in the whole camera and display design.

Other field sequential color display devices as described in U.S. Pat. No. 5,233,338 (issued Aug. 3, 1993 to Surguy for "Display Devices Having Color Sequential Illumination") and U.S. Pat. No. 5,337,068 (issued Aug. 9, 1994 to Stewart, et al. for a "Field sequential color display System Utilizing a Backlit LCD Pixel Array and Method for Forming an Image") use liquid crystal displays that are back lit by red, green, and blue lights that are activated in a time serialized fashion to form color display

3

SUMMARY OF THE INVENTION

The design of field sequential displays have either been for the display of non-interlaced images or have had complex system designs involving the television camera, the transmission equipment, the reception equipment, and the video display. This invention provides a method for the conversion of conventional video display synchronization timing for an interlace image to synchronization timing suitable for an interlaced image on a field sequential display. This method involves receiving the conventional vertical and horizontal synchronization; multiplying the repetition rate of the vertical and horizontal synchronization signals by a factor that is the number of component colors of color video display; selecting segments of the multiplied horizontal synchronization signal; phase shifting those selected segments to align with vertical synchronization pulse; merging the phase shifted horizontal synchronization pulses with the non-shifted segments; and amplifying and buffering the multiplied vertical synchronization signal and the modified horizontal synchronization signal to the deflection control circuits of the CRT of the field sequential color display.

BRIEF DESCRIPTION OF FIGURES

FIGS. 1a and 1b are illustrations of prior art using an electromechanical color wheel to generate the component colors of the field sequential color display.

FIG. 2 is an illustration of prior art using Color Selective Polarizers and LCDs to form an electronic shutter for a field sequential color display.

FIG. 3 is an illustration of the synchronization timing for a conventional non-interlaced.

FIG. 4 is an illustration of the synchronization timing for an interlaced video display.

DETAILED DESCRIPTION OF INVENTION

Figure 6A:
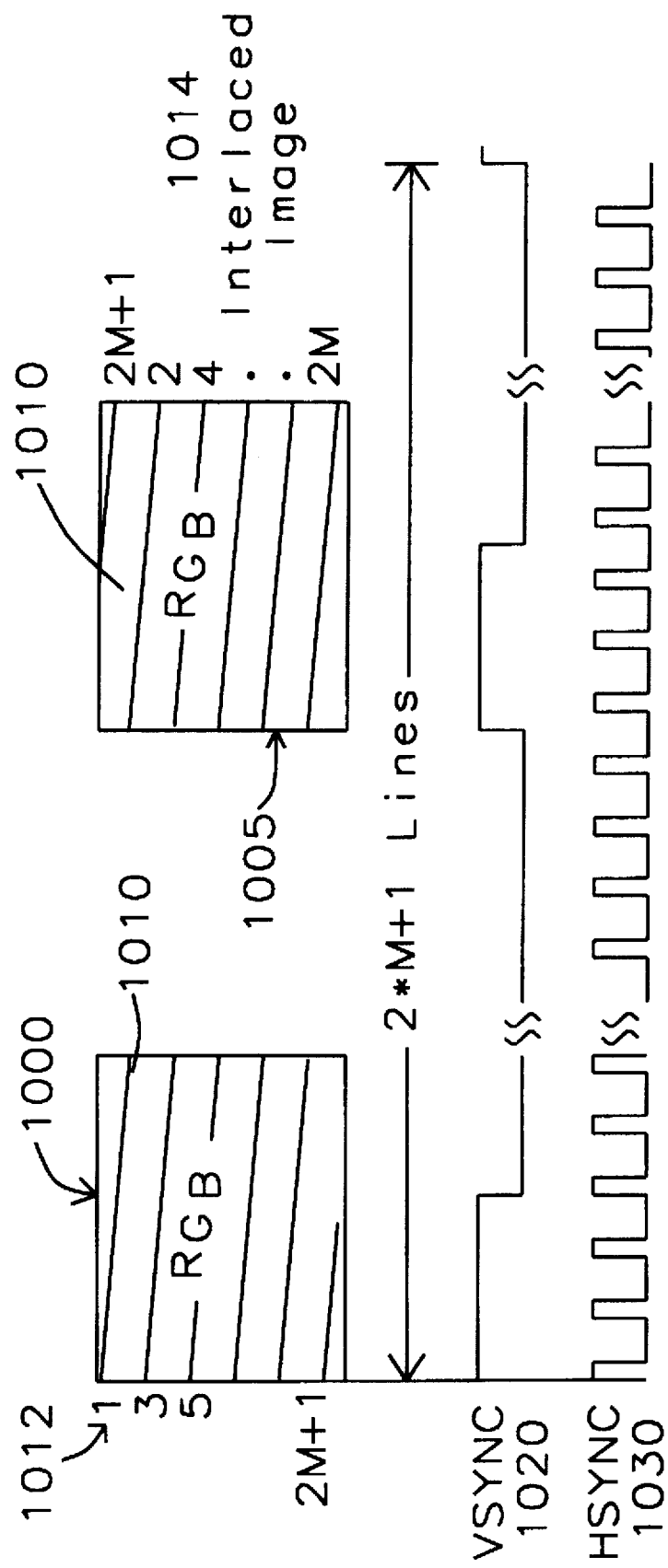
FIGS. 6a, 6b, and 6c are illustrations of the synchronization timing for the conversion of conventional interlaced synchronization to interlaced synchronization for a field sequential color display.

In FIGS. 6a, b, and c the conventional interlaced image consists of two image fields 1000, 1005 wherein the odd number lines 1012 are scanned by the electron beam 1010 on the first image field and the even number lines 1014 are scanned by the electron beam 1010 on the second image 1005. This interlaced scanning requires two vertical synchronization pulses 1020 to scan the full image of one display frame.

Figure 5:
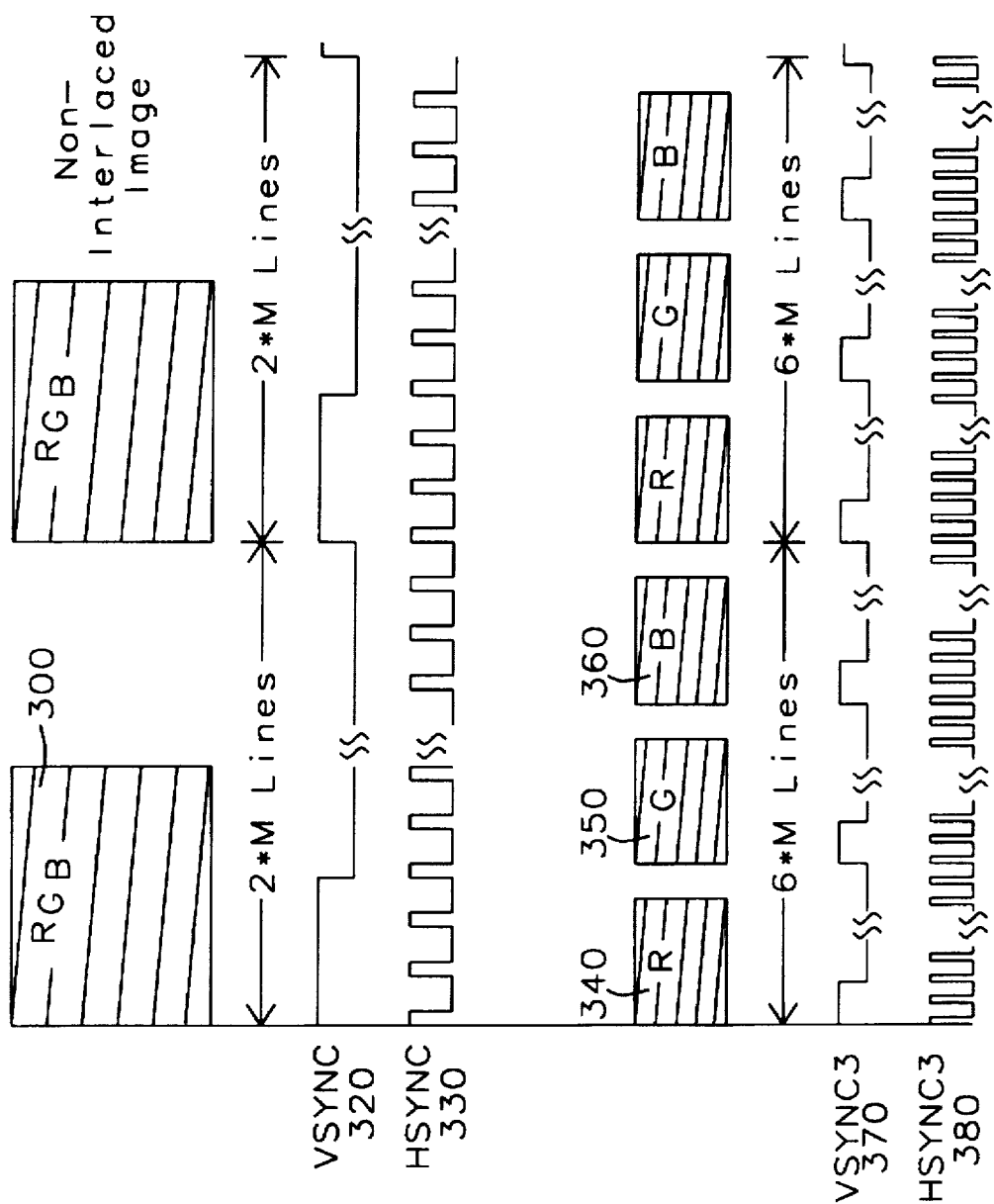
FIG. 5 is an illustration of the synchronization timing for non-interlaced field sequential color displays.
Figure 6B:
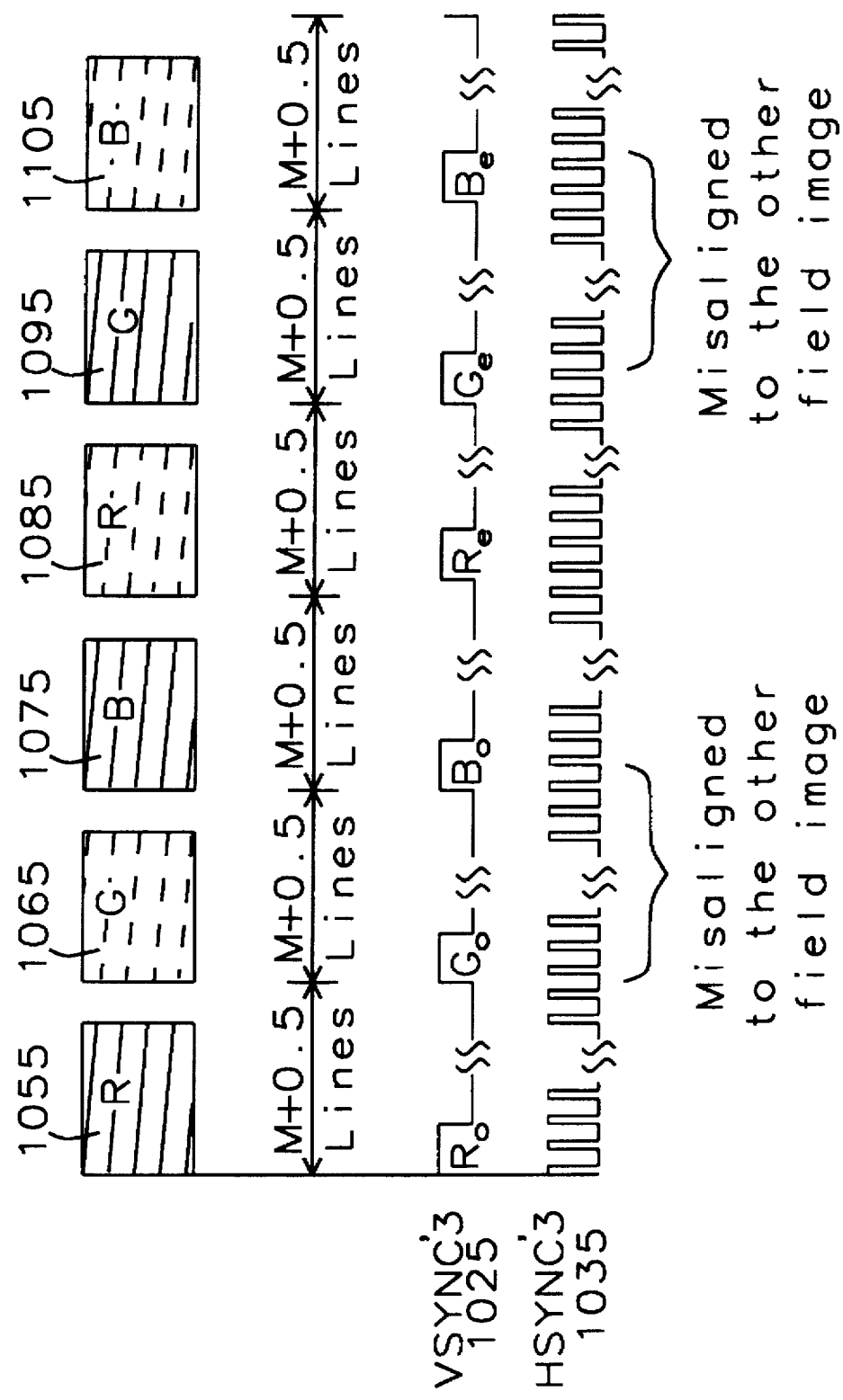

In order to display the conventional interlaced display image on an field sequential color display, the repetition rate of vertical and horizontal synchronization pulses must be multiplied by a factor that is the number of component colors that comprise the video display image. In an implementation of the preferred embodiment as shown in FIG. 5, the number of colors is three (Red, Green, Blue). Therefore, the repetition rate of the vertical synchronization signals VSYNC 1020 and the horizontal synchronization signal HSYNC 1030 is multiplied by the factor of three to form the vertical synchronization signals VSYNC3' 1025 and the horizontal synchronization signals HSYNC3' 1035 in FSCD as illustrated in FIG. 6b. The timing of the first and second green sub-field 1065 and 1095 is such that it will not align properly for synchronization with the red sub-field 1055, 1085 and blue sub-field 1075 1105, thus causing the distortion of the image.

In order to correct the misalignment, the HSYNC3 1050 must be phase shifted during the green sub-field scan times 1072 and 1102 by 180° in relation to the red sub-field scan times 1062 and 1082 and the blue sub-field scan times 1092 and 1112. This phase shifting of the green sub-field scans 1070 and 1100 will align the green sub-field scans 1070 and 1100 properly with the red sub-field scans 1060 and 1090 and the blue sub-field scans 1080 and 1110.

Figure 7:
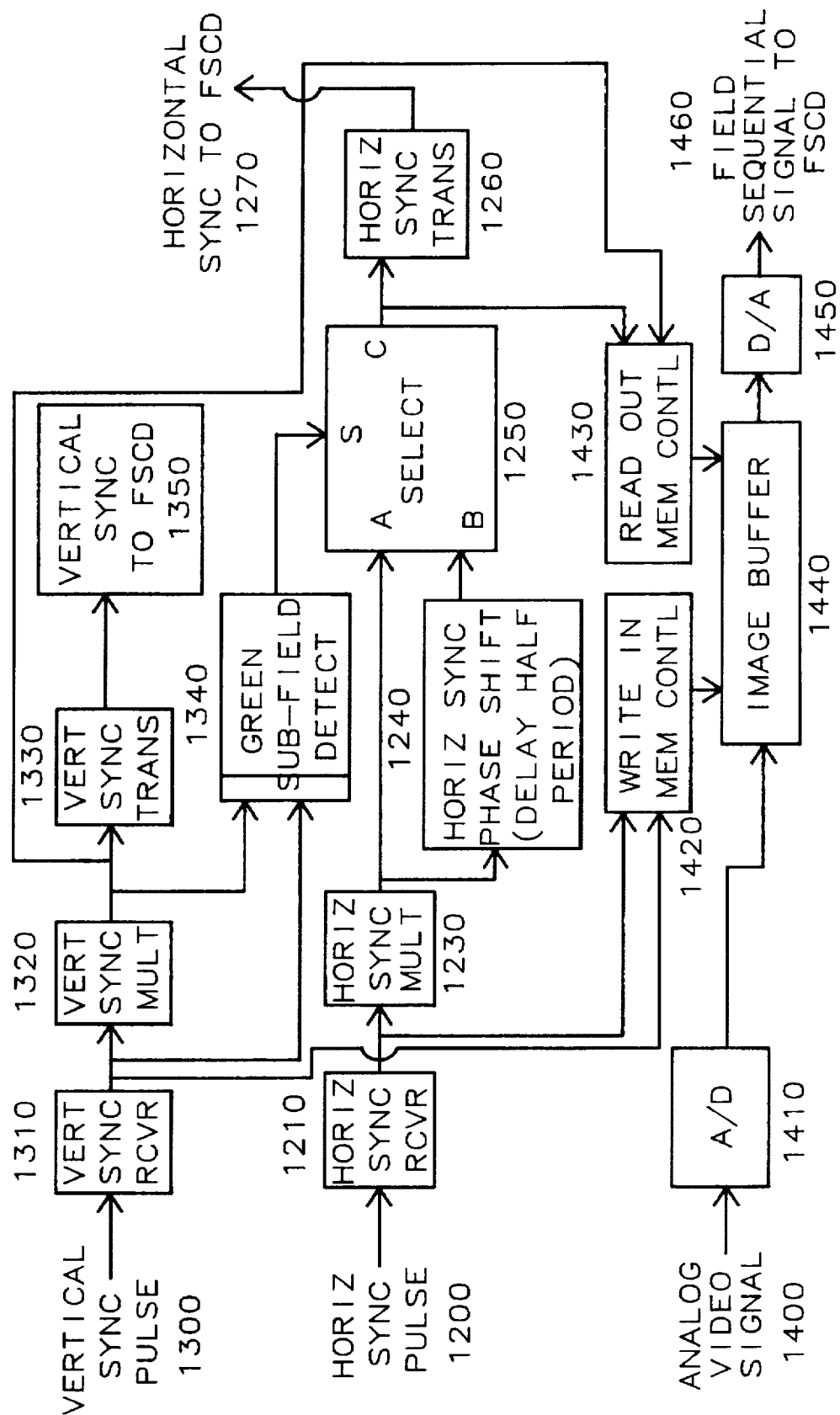
FIG. 7 is a block diagram of conversion circuitry for this invention.

To accomplish the modification of the interlaced horizontal signal, as shown in FIG. 7, the horizontal synchronization pulse 1200 is transferred to the horizontal synchronization receiver 1210, where it is amplified, buffered, and passed to the horizontal synchronization multiplier 1230. The horizontal synchronization multiplier 1230 multiplies the repetition rate of the horizontal synchronization signal by a factor that is equal to the number of color components of the FSCD. The case of the example the number is three. The multiplied horizontal synchronization signal is then transferred to a horizontal synchronization phase shifter 1240, where the multiplied horizontal synchronization signal is shifted in phase by an amount that is $$360°/T$$

Where

T is the number of scans being interlaced to form a display image.

In the example with two interlaces the phase shift will be 180°.

The selector 1250 has the original multiplied horizontal synchronization signal and the phase shifted horizontal synchronization signal as inputs. The output of the selector 1250 will be either the original multiplied horizontal synchronization signal or the phase shifted multiplied horizontal synchronization signal depending on the state of the control signal generated by the green sub-field detector 1340. The output of the selector is operably connected to the horizontal synchronization transmitter 1260, which adjusts the voltage and current amplitudes of the modified horizontal synchronization signal such that it will properly activate the horizontal synchronization circuits of the FSCD 1270.

The vertical synchronization pulse 1300 is transferred to the vertical synchronization receiver 1310, where it is amplified, buffered and passed on to the vertical synchronization multiplier 1320 and the green field detector 1340. In the vertical synchronization multiplier 1320, the repetition rate of the vertical synchronization signal is multiplied by the number of color components of the FSCD. In the example the number is three. The multiplied vertical synchronization signal is then passed to the vertical synchronization transmitter 1330 and the green field detector 1340. The vertical synchronization transmitter 1330 adjusts the voltage and current of the multiplied vertical synchronization signal to levels necessary to activate the vertical synchronization circuits of the FSCD 1350.

The green sub-field detector 1340 determines from the vertical synchronization signal and the multiplied synchronization signal the exact period of the occurrence of the green sub-field during the period of each frame of the FSCD image.

The analog video signal 1400 containing the amplitude information of the component colors is converted in an analog-to-digital converter 1410 to a digital representation of the original analog signal and passed to an image buffer 1440, where it can be retained. The controls to store the digital representation of the original analog video signal are generated in the write in memory controller 1420. The write in memory controller 1420 is operably connected to the vertical synchronous receiver 1310 and the horizontal synchronous receiver 1210. The vertical and horizontal synchronous pulses determine the timing of the controls that allow the writing of the image buffer 1440.

The read out memory control 1430 is operably connected to the output of the vertical synchronization multiplier and the output of the selector 1250. The timing of the accessing of the data in the image buffer is determined by the multiplied vertical synchronization signal and the modified horizontal synchronization signal.

The signal to access the digital representation of the analog video signal is passed from the read out memory control 1430 to the image buffer 1440. The digital representation of the analog video signal is then passed to a digital-to-analog converter 1450 where it is converted to a field sequential signal 1460 capable of modulating the electron beam of the FSCD.

Figure 6C:
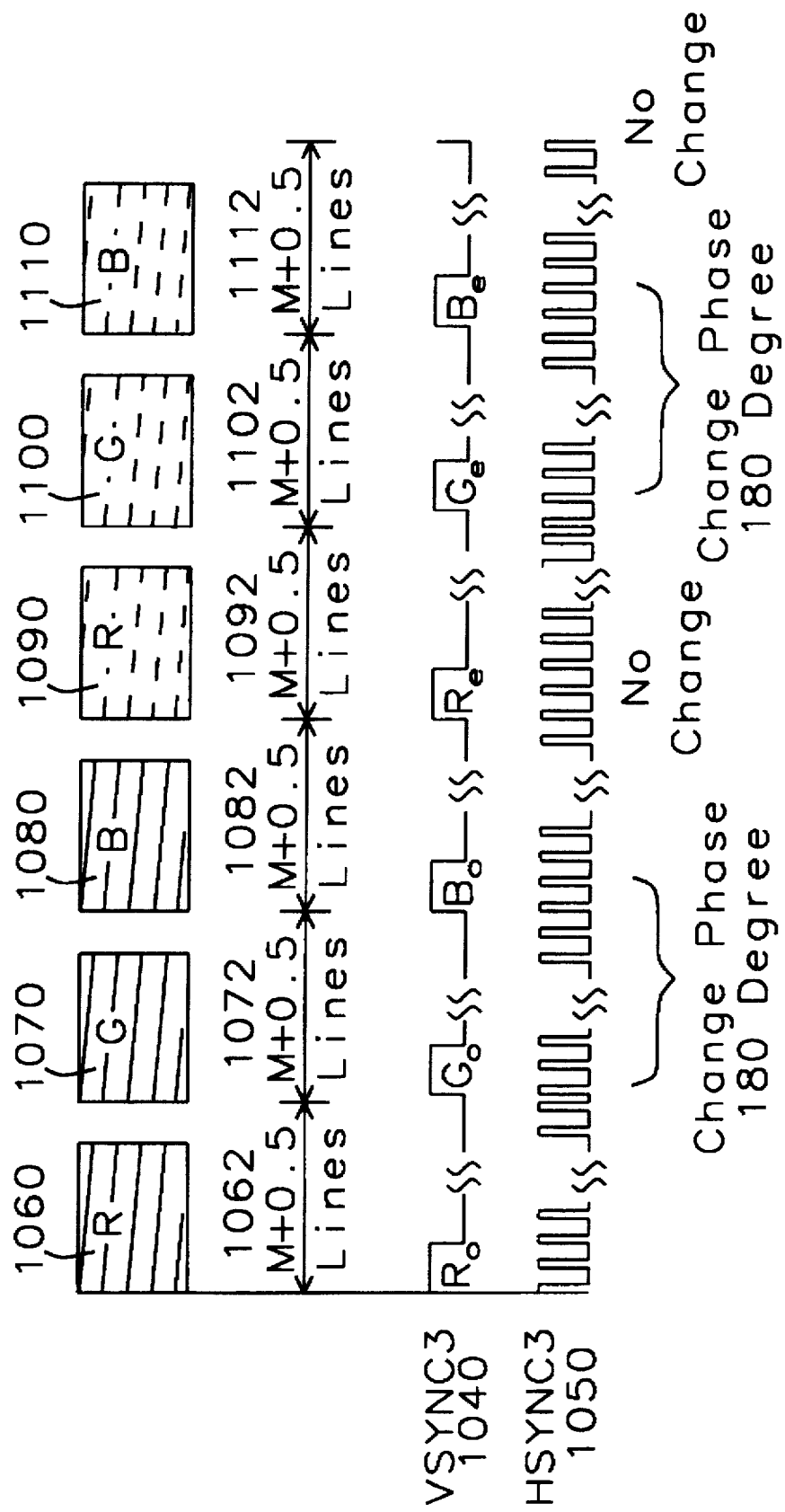
Figure 8A:
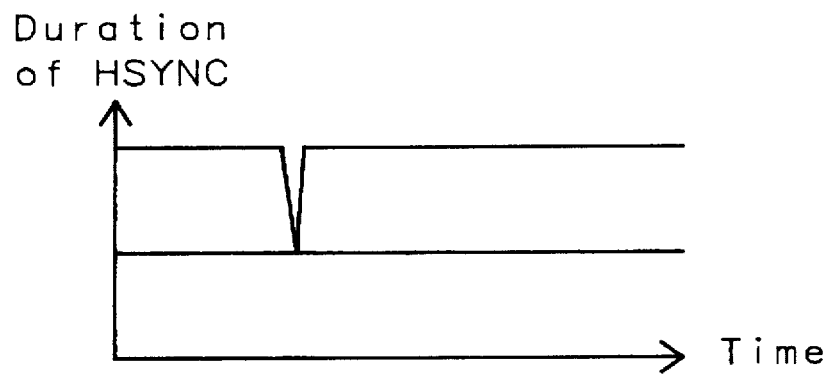
FIG. 8a, 8b, and 8c is a block diagram showing the vertical and horizontal control circuitry for video display and the electrical waveforms of the response of the control circuitry.
Figure 8B:
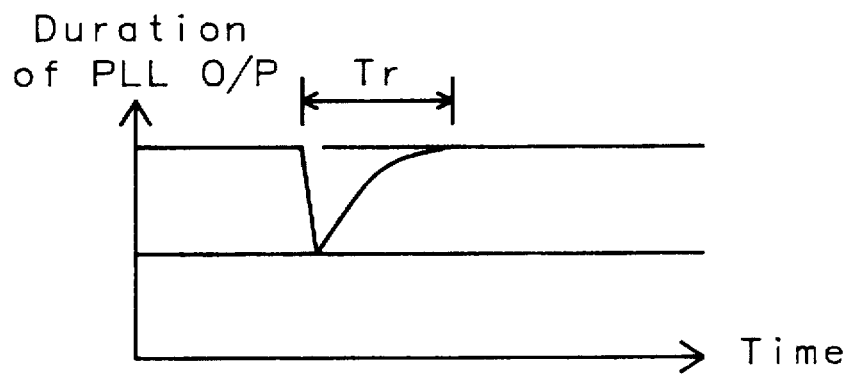
Figure 8C:
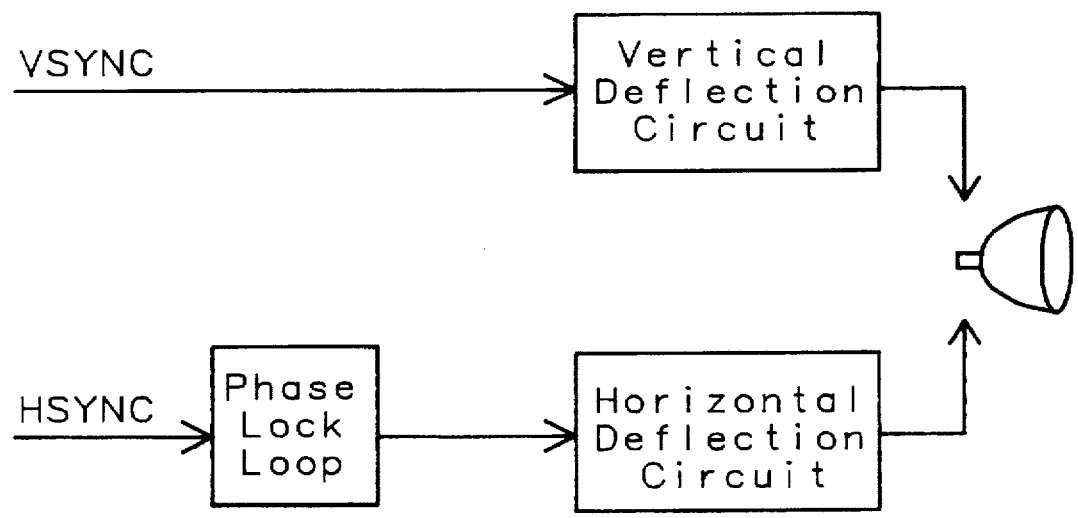

Because of the phase shifting of the synchronization pulses shown in FIG. 6c, the timing between the pulses of the horizontal synchronization pulse HSYNC3 1050 is not constant even though the repetition rate remains constant. That is to say, the timing between the beginning and ending pulse of the second sub-field and the adjacent pulse of its adjacent sub-field is one half of the timing between the other HSYNC3 pulses. The horizontal deflection circuits of most CRT's are controlled by a phase locked loop as shown in FIGS. 8a, b, and c. The shift in phase of the input horizontal synchronization pulses HSYNC3 will cause the phase lock loop to change its frequency. This shift and the tracking of the PLL will happen during the period that the display must be done during the vertical blank time so that it will not influence the visual area of the screen. In the National Television Systems Committee standard, the horizontal scan lines is approximately 63.5µ seconds in duration. The vertical blanking period is approximately 635µ (or 10 scan lines). When the video signal is converted to an FSCD format and the frequency of the synchronization pulses are multiplied by the number of color components in this case three, the time for the recovery of the phase lock loop has to occur during the horizontal blanking period therefore Tr<212µ seconds.

Figure 9:
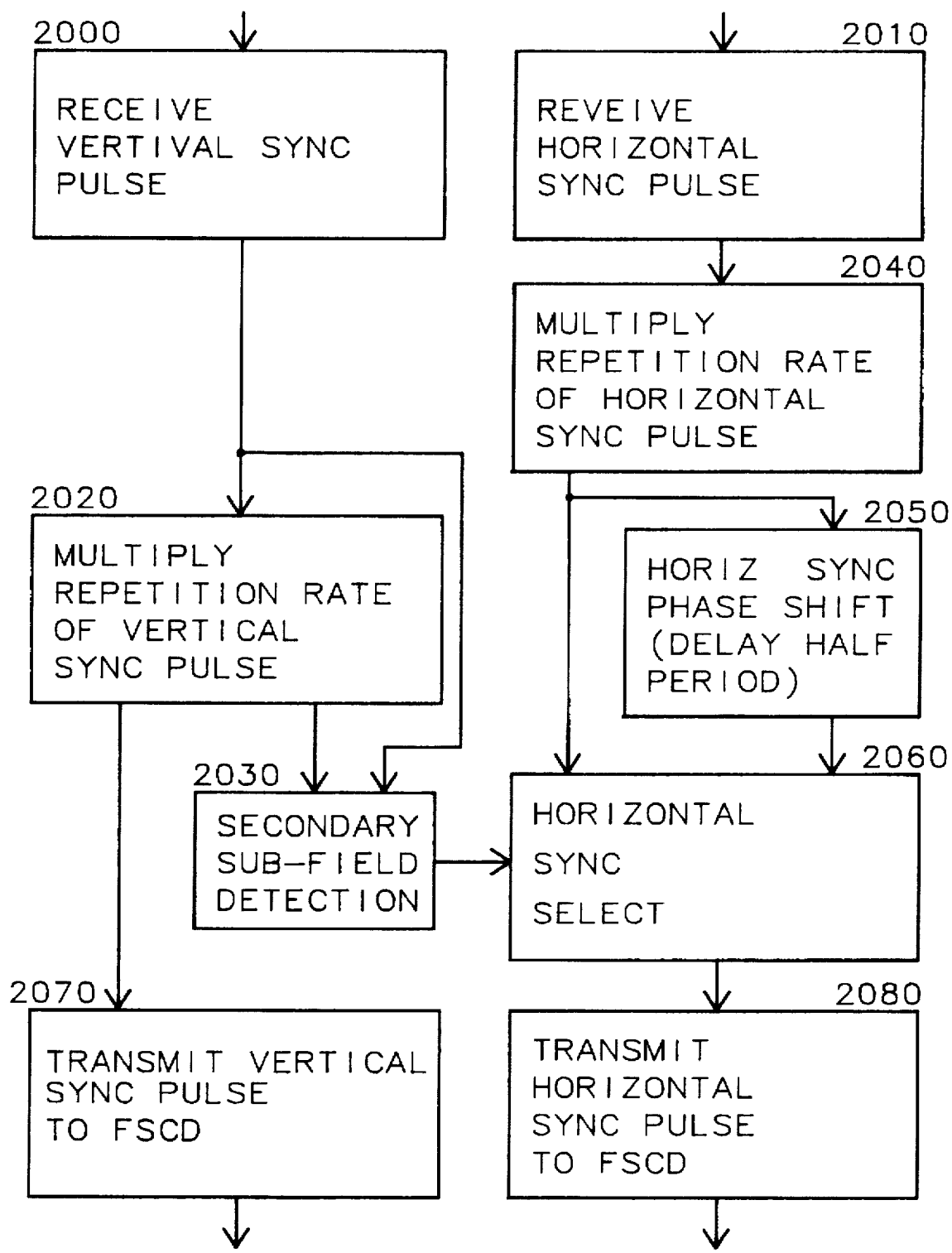
FIG. 9 is a diagram of the process defining the method of this invention.

Referring to FIG. 9, the first steps for the method for the conversion from conventional interlaced video display synchronization to the synchronization of an interlaced field sequential color display are the steps of receiving the vertical synchronization pulses 2000 and the horizontal synchronization pulses 2010. Next the repetition rate of the vertical synchronization pulses is multiplied by a factor that is the number of component colors that comprise video display image 2020. In the case of the TV example the number is 3. The following step is the detecting the secondary sub-field 2030 which in the TV example is the green sub-field. Simultaneously the repetition rate of the horizontal synchronization pulses is multiplied by a factor that is the number of component colors that comprise the video display image 2040, as before in the TV example the multiplication factor is three. The multiplied horizontal synchronization pulses are delayed by half period to make a phase shift of 180° 2050. The result of the secondary sub-field detection creates a selection signal that selects the non-shifted time segments or shifted time segments to form the appropriately timed horizontal synchronization pulses according to the sub-field detection 2060. The vertical and horizontal synchronization pulses are then transmitted to the field sequential color display 2070, 2080. Finally the aforementioned steps are repeated for each display frame of the field sequential color display.

What is claimed:

1. A method for the conversion of a horizontal synchronization signal and a vertical synchronization signal of an interlaced parallel color video display to form a horizontal field sequential video display synchronization signal and a vertical field sequential video display synchronization signal of an interlaced field sequential video display comprising the steps of:

a) receiving the vertical synchronization signal having a repetition rate;

b) receiving the horizontal synchronization signal having a repetition rate;

c) multiplying the repetition rate of the vertical synchronization signal by a factor that represents a number of component colors that form the interlaced parallel color video display to form the vertical field sequential video display synchronization signal;

d) multiplying the repetition rate of the horizontal synchronization signal by a factor that represents the number of component colors that form interlaced parallel color video display to form a multiplied horizontal synchronization signal;

e) selecting time segments of the multiplied horizontal synchronization signal;

f) phase shifting the time segments of the multiplied horizontal synchronization signal that were previously selected to align with the vertical field sequential video display synchronization signal;

g) merging of the time segments of the multiplied horizontal synchronization signal that were selected and phase shifted and with those time segments of the multiplied horizontal synchronization that were not selected and phase shifted to form the horizontal field sequential video display synchronization signal;

h) buffering and amplifying of the horizontal field sequential video display synchronization signal to act as a first input to the field sequential video display; and i) buffering and amplifying of the vertical field sequential video display synchronization signals to act as a second input to the field sequential video display.

2. The method of claim 1 wherein receiving of the vertical synchronization signal is further comprising the steps of amplifying and buffering of the vertical synchronization signal for use in subsequent circuitry.

3. The method of claim 1 wherein receiving of the horizontal synchronization signal is further comprising the steps of amplifying and buffering of the horizontal synchronization signal for use in subsequent circuitry.

4. The method of claim 1 wherein selecting of the time segments of multiplied horizontal signal is determined by detecting of an appropriate period of the vertical synchronization signal that represents a color field that requires phase shifting to align with the vertical synchronization signal.

5. The method of claim 1 wherein phase shifting of the time segments of the multiplied horizontal synchronization signal that were previously selected is accomplished by delaying the time segments of the multiplied horizontal synchronization signal that were previously selected by a phase angle equal to:

$$360°/T$$

Where:

T is a number of interlaces of an interlaced parallel color video display.

6. A synchronization converter for the conversion of horizontal synchronization signal and vertical synchronization signal of an interlaced parallel color video display to a field sequential color display horizontal synchronization signal and a field sequential color display vertical synchronization signal of an interlaced field sequential color display is comprising:

a) a horizontal receiver means to amplify and buffer the horizontal synchronization signal of the interlaced parallel color video display;

b) a vertical receiver means to amplify and buffer the vertical synchronization signal of the interlaced parallel color video display;

c) a vertical repetition rate multiplier means wherein the vertical synchronization signal of the interlaced parallel color video display is multiplied by a number of color components of the interlaced parallel color video display to form the field sequential color display vertical synchronization signal;

d) a horizontal repetition rate multiplier means wherein the horizontal synchronization signal of the interlaced parallel color video display is multiplied by the number of color components of the parallel color video display to form a multiplied horizontal synchronization signal;

e) a multiplied horizontal synchronization selection means that selects time segments of the multiplied horizontal synchronization signal;

f) a time segment phase shifting means that adjusts the multiplied horizontal synchronization signal that have been selected to align with a single pulse of the field sequential color display vertical synchronization signal;

g) a horizontal synchronization merging means to merge time segments of the multiplied horizontal synchronization signal that have been selected and adjusted with those time segments of the multiplied horizontal synchronization signal that have not been selected and adjusted to form the field sequential color display horizontal synchronization signal;

h) a horizontal synchronization buffer and amplifier means that buffers and amplifies the field sequential video display horizontal synchronization signal to act as a first input to the interlaced field sequential color display; and i) a vertical synchronization buffer and amplifier means that buffers and amplifies the field sequential video display vertical synchronization signal to act as a second input the interlaced field sequential color display.

7. The synchronization converter of claim 6 wherein the multiplied horizontal synchronization selection means logically combines the field sequential video display vertical synchronization signal and the vertical synchronization signal of the interlaced parallel color video display are logically combined to form an appropriate time segment selection signal.

8. The synchronization converter of claim 6 wherein the time segment phase shifting means adjusts multiplied horizontal synchronization signal by delaying the multiplied horizontal synchronization signal by a period of time equal to $$\frac{1}{PPR \times T}$$

where

PPR is a pulse repetition rate of the multiplied horizontal synchronization signal, T is a number of interlaces present in the interlaced parallel color video display.

9. The synchronization converter of claim 6 wherein the horizontal synchronization merging means selects either the multiplied horizontal synchronization signal or the multiplied horizontal synchronization signal that has been adjusted, dependent on a state of the appropriate time segment selection signal, to form the field sequential color display horizontal synchronization signal that has the correct pulse sequence necessary to activate horizontal synchronization circuits of the interlaced field sequential color display.

10. A synchronization converter to convert a first horizontal synchronization signal and a first vertical synchronization signal of a dual interlaced three parallel color video display to a second horizontal synchronization signal and a second vertical synchronization signal for a dual interlaced three color field sequential video display comprising:

a) a horizontal receiving means to amplify and buffer the first horizontal synchronization signal;

b) a vertical receiving means to amplify and buffer the first vertical synchronization signal;

c) a vertical repetition multiplier means for the multiplication of the first vertical synchronization signal by a factor of three to form the second vertical synchronization signal;

d) a horizontal repetition multiplier means for the multiplication of the first horizontal synchronization signal by the factor of three to form a multiplied horizontal synchronization signal;

e) a multiplied horizontal synchronization selection means to select time segments of the multiplied horizontal synchronization signal;

f) a phase shifting means to phase shift those time segments of the multiplied horizontal synchronization signal that had been selected by 180 degrees;

g) a horizontal synchronization segment merging means to merge the time segments of the multiplied horizontal synchronization signal that had been selected and Phase shifted with those time segments of the multiplied horizontal synchronization signal that had not been selected to form the second horizontal synchronization signal;

h) a horizontal buffering and amplification means to buffer and amplify the second horizontal synchronization signal to act as a first input to the interlaced field sequential color display; and i) a vertical buffering and amplification means to buffer and amplify the second vertical synchronous signal to act as a second input to the dual interlaced three color field sequential video display.

11. The synchronous converter of claim 10 wherein the selection of segments of the multiplied horizontal synchronization signal corresponds to a time when a second color and a time when a third color of three colors of the dual interlaced three parallel color video display are to be transferred to dual interlaced three color field sequential video display.

* * * * *